Patented July 26, 1932

1,869,063

UNITED STATES PATENT OFFICE

ADOLF KREBSER, OF BASEL, SWITZERLAND, ASSIGNOR TO THE FIRM OF J. R. GEIGY S. A., OF BASEL, SWITZERLAND

MANUFACTURE OF DISAZODYESTUFFS FOR DYING AND PRINTING WOOL

No Drawing. Application filed August 30, 1930, Serial No. 479,093, and in Germany August 9, 1929.

I have made the surprising observation that new precious disazodyestuffs result by combining tetrazo compounds of diaminodiphenylmethanedisulfonic acids and their derivatives with two molecules of a naphtholmonosulphonic acid.

It could not be foreseen that dyestuffs of the type resulting from diaminodiphenylmethanedisulphonic acid and two molesules of a naphtholmonosulphonic acid, which thus contain four sulpho groups symmetrically distributed on the four nuclei, when dyed on wool, would surpass the corresponding dyestuffs unsulphonated in the diaminodiphenylmethane residue and which, contain only two sulpho groups (see German Patent No. 325,062), with respect to their fastness to light, that they show also a good fastness to fulling and a very good solidity to sulphur, that they leave cotton effects pure white and that they possess—which is particularly important—excellent properties for the direct printing on wool.

These dyestuffs yield on wool, for example with oxalate of ammonia, fairly equalizing, covered prints of pure shade, of good fixation and fastness to water and ammonia and of remarkable fastness to light.

The following examples illustrate the invention:

Example 1

34 kilos of 3:3'-diamino-4:4'-dimethyldiphenylmethane (see Journal für Praktische Chemie N. F. 82, 236, 1910) are introduced into 120 kilos of sulphuric acid in the form of monohydrate and dissolved at 70° C. Thereupon the mass is slowly mixed at 10–15° C. with 90 kilos of oleum of 30% and stirred at 60° C. until a test is easily soluble in water and soda solution. Then the solution is treated with lime at 80° C., converted by means of soda into the sodium salt and filtered. The clear solution of the 3:3'-diamino-4:4'-dimethyldiphenylmethane disulphonic acid is then tetrazotized in the usual way and coupled with an aqueous solution of 70 kilos of 1:4-naphtholsulphonic acid and 60 kilos of soda. After some hours, the reaction mass is heated to 60° C. and the dyestuff is salted out, filtered and dried. The dyestuff constitutes a red powder; it dissolves in water with blue-red coloration, in concentrated sulphuric acid with red coloration and yields in dyeing and printing on wool a beautiful red shade with the good properties above stated. The dyestuff obtained according to this example has the following formula:

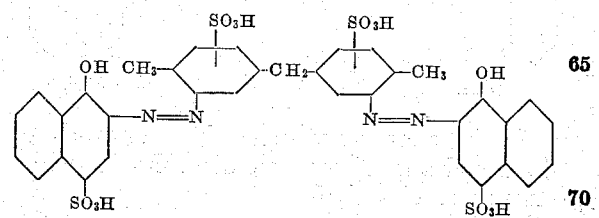

Example 2

34 kilos of 4:4'-diamino-3:3'-dimethyldiphenylmethane are sulphonated as indicated in Example 1, see also B. Berichte 27, 1813 (1894). The thus obtained 4:4'-diamino-3:3'-dimethyldiphenylmethane disulphonic acid is then tetrazotized in the usual manner and coupled with 70 kilos of 2:6-naphtholsulphonic acid and 60 kilos of soda. After the coupling being achieved, the reaction mass is heated to 60° C. and the dyestuff is salted out, filtered and dried. The dyestuff constitutes a red powder and dissolves in water with yellow-red and in concentrated sulphuric acid with blue-red coloration. It yields in dyeing and printing on wool fast orange tints. The dyestuff obtained according to this example has the following formula:

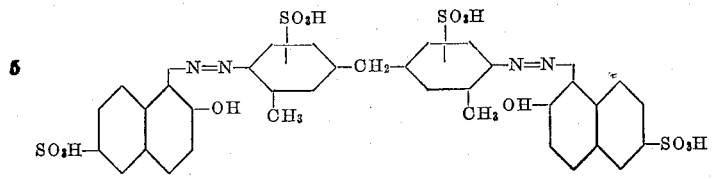

Example 3

34 kilos of 4:4'-diamino-2:2'-dimethyldiphenylmethane are dissolved at 70° C. in 130 kilos of sulphuric acid monohydrate and sulphonated at 10° C. with 110 kilos of oleum of 30%, then stirred at 50° C. until a test is easily and clearly soluble in water and soda solution. The 4:4'-diamino-2:2'-dimethyldiphenylmethane disulphonic acid, which separates out on diluting with 4 parts of water, or the sodium salt solution obtained with lime is then tetrazotized in the usual way and coupled with 70 kilos of 1:4-naphtholsulphonic acid and 60 kilos of soda. After some hours, the dyestuff is salted out, filtered and dried. It constitutes a red powder and is soluble in water with yellow-red and in concentrated sulphur acid with blue-red coloration. It yields in dyeing and printing on wool beautiful red tints. The dyestuff obtained according to this example has the following formula:

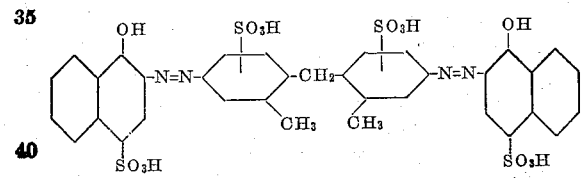

In the above examples other tetrazotized diaminodiphenylmethane disulphonic acids may be employed.

What I claim is:—

1. A process for the manufacture of disazodyestuffs for dyeing and printing wool, consisting in coupling tetrazocompounds of diaminoditolylmethanedisulphonic acids with two molecules of a naptholmonosulphonic acid.

2. A process for the manufacture of disazodyestuffs for dyeing and printing wool, consisting in coupling tetrazocompounds of diaminoditolylmethanedisulphonic acids with two molecules of 1:4-naptholsulphonic acid.

3. As new articles of manufacture, the hereinbefore described disazodyestuffs having the constitution of ditolylmethanedisulphonic acid-disazo-bis-naptholmonosulphonic acids, said dyestuffs being soluble in water and concentrated sulphuric acid with blue-red to red coloration and yielding in dyeing and printing on wool beautiful red shades with good fastness to light, fulling, sulphur, leaving cotton effects pure white and being particularly adapted for direct prints on wool.

In witness whereof I have hereunto signed my name this 22nd day of August, 1930.

ADOLF KREBSER.